US012305430B2

(12) United States Patent
Cho et al.

(10) Patent No.: US 12,305,430 B2
(45) Date of Patent: May 20, 2025

(54) DOOR HANDLE ASSEMBLY AND RELATED METHODS

(71) Applicant: Huf Hülsbeck & Fürst GmbH & Co. KG, Velbert (DE)

(72) Inventors: Yong Sang Cho, Novi, MI (US); Suat Kaya, Novi, MI (US); Sami Yanikoglu, Ann Arbor, MI (US); Ayushi Srivastava, Farmington Hills, MI (US)

(73) Assignee: Huf Hulsbeck & Furst GMBH & Co. KG, Velbert (DE)

( * ) Notice: Subject to any disclaimer, the term of this patent is extended or adjusted under 35 U.S.C. 154(b) by 725 days.

(21) Appl. No.: 17/253,186

(22) PCT Filed: May 29, 2019

(86) PCT No.: PCT/IB2019/054451
§ 371 (c)(1),
(2) Date: Dec. 17, 2020

(87) PCT Pub. No.: WO2020/012261
PCT Pub. Date: Jan. 16, 2020

(65) Prior Publication Data

US 2021/0324663 A1 Oct. 21, 2021

Related U.S. Application Data

(60) Provisional application No. 62/695,218, filed on Jul. 9, 2018.

(51) Int. Cl.
*E05B 79/06* (2014.01)
*E05B 85/16* (2014.01)

(52) U.S. Cl.
CPC .............. *E05B 79/06* (2013.01); *E05B 85/16* (2013.01)

(58) Field of Classification Search
CPC ........... E05B 79/06; E05B 85/16; E05B 77/06
See application file for complete search history.

(56) References Cited

U.S. PATENT DOCUMENTS 5,421,061 A * 6/1995 Kolle ...................... E05B 79/06 292/336.3
11,274,475 B2 * 3/2022 Beck ...................... E05B 85/06
(Continued)

FOREIGN PATENT DOCUMENTS

CN 102177303 A 9/2011
CN 102444321 A 5/2012
(Continued)

OTHER PUBLICATIONS

China National Intellectual Property Administration, First Office Action for Application No. 201980045819.0, mailed Jun. 3, 2021.
(Continued)

*Primary Examiner* — Michael P Ferguson
*Assistant Examiner* — Thomas L Neubauer
(74) *Attorney, Agent, or Firm* — Honigman LLP; Matthew H. Szalach

(57) ABSTRACT

A door handle assembly includes a bracket, a slide member, and a counterweight. The slide member is coupled to the bracket and configured to translate between a first position and a second position. The counterweight is pivotally coupled to the bracket and configured to the pivot between a first rotational position and a second rotational position. Upon translation of the slide member from the second position to the first position, the slide member is operable to (i) rotate the counterweight in a first direction from the second rotational position to the first rotational position and (ii) prevent rotation of the counterweight in a second direction from the first rotational position.

13 Claims, 9 Drawing Sheets

(56) References Cited

U.S. PATENT DOCUMENTS

| | | | | |
|---|---|---|---|---|
| 2003/0038486 | A1 * | 2/2003 | Nomura | E05B 79/06 292/336.3 |
| 2010/0300160 | A1 * | 12/2010 | Westwinkel | E05B 9/08 70/78 |
| 2012/0104774 | A1 | 5/2012 | Park et al. | |
| 2014/0354007 | A1 * | 12/2014 | Ogawa | E05B 77/06 296/146.2 |
| 2016/0369532 | A1 * | 12/2016 | Beck | E05B 79/06 |
| 2017/0030117 | A1 * | 2/2017 | Savant | E05B 85/14 |
| 2018/0187458 | A1 * | 7/2018 | Beck | E05B 85/16 |
| 2019/0055761 | A1 * | 2/2019 | Yoshino | E05B 85/16 |
| 2020/0386019 | A1 * | 12/2020 | Jeong | E05B 85/107 |
| 2021/0246692 | A1 * | 8/2021 | Fuchs | E05B 79/08 |

FOREIGN PATENT DOCUMENTS

| | | | | |
|---|---|---|---|---|
| DE | 102009043933 | A1 | 3/2011 | |
| EP | 1473423 | A2 * | 11/2004 | E05B 77/04 |
| EP | 3032015 | A1 | 6/2016 | |
| JP | H08118953 | A | 5/1996 | |

OTHER PUBLICATIONS

European Patent Office (ISA), International Search Report and Written Opinion for PCT Application No. PCT/IB2019/054451, mailed Sep. 23, 2019.
European Patent Office, First Office Action for EP Application No. 19733874.2 mailed Jun. 13, 2022.

* cited by examiner

DOOR HANDLE ASSEMBLY AND RELATED METHODS

CROSS REFERENCE TO RELATED APPLICATIONS

This application is a 371 National Stage Entry of International Application No. PCT/IB2019/054451, filed May 29, 2019, which claims priority to U.S. Provisional Application No. 62/695,218, filed Jul. 9, 2018, the disclosures of which are hereby incorporated by reference in their entirety.

FIELD

The present disclosure relates generally to a door handle assembly and related methods, and more particularly to a door handle assembly having a door handle and a corresponding bracket.

BACKGROUND

This section provides background information related to the present disclosure and is not necessarily prior art.

Door handle assemblies are used on automobiles and other vehicles to allow a user to open a door and access an interior portion of the vehicle. Known door handle assemblies often include a bracket and a handle that is rotatably coupled to the bracket. Rotation of the handle relative to the bracket causes the handle to actuate a latch that couples the door to another portion of the vehicle, thus allowing the user to move (e.g., rotate or pivot) the door relative to the other portion of the vehicle. The bracket is often retained in a preferred position relative to a door panel (e.g., sheet metal) using any number of fasteners or clips. These retention methods can restrict the overall size and assembly methods that can be used with the door handle assembly. Many original equipment manufacturers also have procedures in place to extract or service door handle assemblies, or parts thereof, through an inner side of the door.

While known door handle assemblies, and related methods of assembly and use, have proven acceptable for their intended purposes, there remains a continuous need for improvement in the relevant art.

SUMMARY

This section provides a general summary of the disclosure, and is not a comprehensive disclosure of its full scope or all of its features.

One aspect of the disclosure provides a door handle assembly. The door handle assembly may include a bracket, a slide member, and a counterweight. The slide member may be coupled to the bracket and configured to translate between a first position and a second position. The counterweight may be pivotally coupled to the bracket and configured to rotate between a first rotational position and a second rotational position. Upon translation of the slide member from the second position to the first position, the slide member may be operable to (i) rotate the counterweight in a first direction from the second rotational position to the first rotational position and (ii) prevent rotation of the counterweight in a second direction from the first rotational position.

Implementations of the disclosure may include one or more of the following optional features. In some implementations, the door handle assembly includes an actuator operably coupled to the counterweight. Upon translation of the slide member from the first position to the second position, the actuator may be operable to rotate the counterweight in the second direction.

In some implementations, the door handle assembly includes a lock cylinder coupled to the bracket. The slide member may engage the lock cylinder in the second position.

In some implementations, the door handle assembly includes a handle rotatably coupled to the bracket. The handle may include a body and a leg extending from the body and coupled to the counterweight. The counterweight may be configured to rotate the handle relative to the body upon rotation in the first direction and the second direction. The counterweight may include a hook and the leg may include a pin pivotally coupled to the hook.

In some implementations, the counterweight includes an engagement surface and the slide member includes a guide surface. The guide surface may be configured to slidably engage the engagement surface to rotate the counterweight in the first direction.

In some implementations, the door handle assembly includes an actuation member configured to translate the slide member from the first position to the second position. The actuation member may be rotatably coupled to the bracket and threadably coupled to the slide member.

Another aspect of the disclosure provides a door handle assembly. The door handle assembly may include a bracket, a slide member, a counterweight, a handle, and an actuator. The slide member may be translatably coupled to the bracket. The counterweight may be pivotally coupled to the bracket and may include a handle-receiving portion. The handle may be rotatably coupled to the bracket and may include a leg portion pivotally received by the handle-receiving portion. The actuator may be operably coupled to the counterweight and may be configured to pivot the counterweight in a first direction. The slide member may be operable to pivot the counterweight in a second direction opposite the first direction.

This aspect may include one or more of the following optional features. In some implementations, the slide member includes a stop surface operable to abut the counterweight and inhibit rotation of the counterweight in the second direction.

In some implementations, upon translation of the slide member from a first position to a second position, the actuator is operable to rotate the counterweight in the first direction.

In some implementations, the slide member includes an aperture, and the door handle assembly further includes a lock cylinder coupled to the bracket and disposed within the aperture.

In some implementations, the counterweight is configured to rotate the handle in the first direction relative to the bracket.

In some implementations, the handle-receiving portion includes a hook and the leg portion includes a pin pivotally coupled to the hook.

In some implementations, the counterweight includes an engagement surface configured to slidably engage the slide member to pivot the counterweight in the second direction.

In some implementations, the door handle assembly includes an actuation member configured to translate the slide member from a first position to a second position. The actuation member may be rotatably coupled to the bracket and threadably coupled to the slide member.

Yet another aspect of the disclosure provides a method of assembling a door handle assembly. The method may include coupling a door handle to a bracket and a counterweight. The counterweight may be pivotally supported by the bracket. The method may also include translating a slide member relative to the bracket to allow the counterweight to pivot relative to the bracket. The method may further include engaging the counterweight with the door handle to rotate the door handle relative to the bracket.

In some implementations, the method includes coupling a lock cylinder to the bracket prior to coupling the door handle to the bracket. Rotating the door handle relative to the bracket may include disposing the lock cylinder within an aperture of the door handle.

In some implementations, the method includes rotating an actuating member threadably engaged with the slide member to translate the slide member relative to the bracket.

Another aspect of the disclosure provides a door handle assembly comprising a handle, a movable clamping mechanism (e.g., a slider), and a counterweight. The clamping mechanism may be linked or coupled to the counterweight to allow a user to move the handle between a pre-assembly staging position and an assembled position, where the user can move the handle between an open position and a closed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1A:
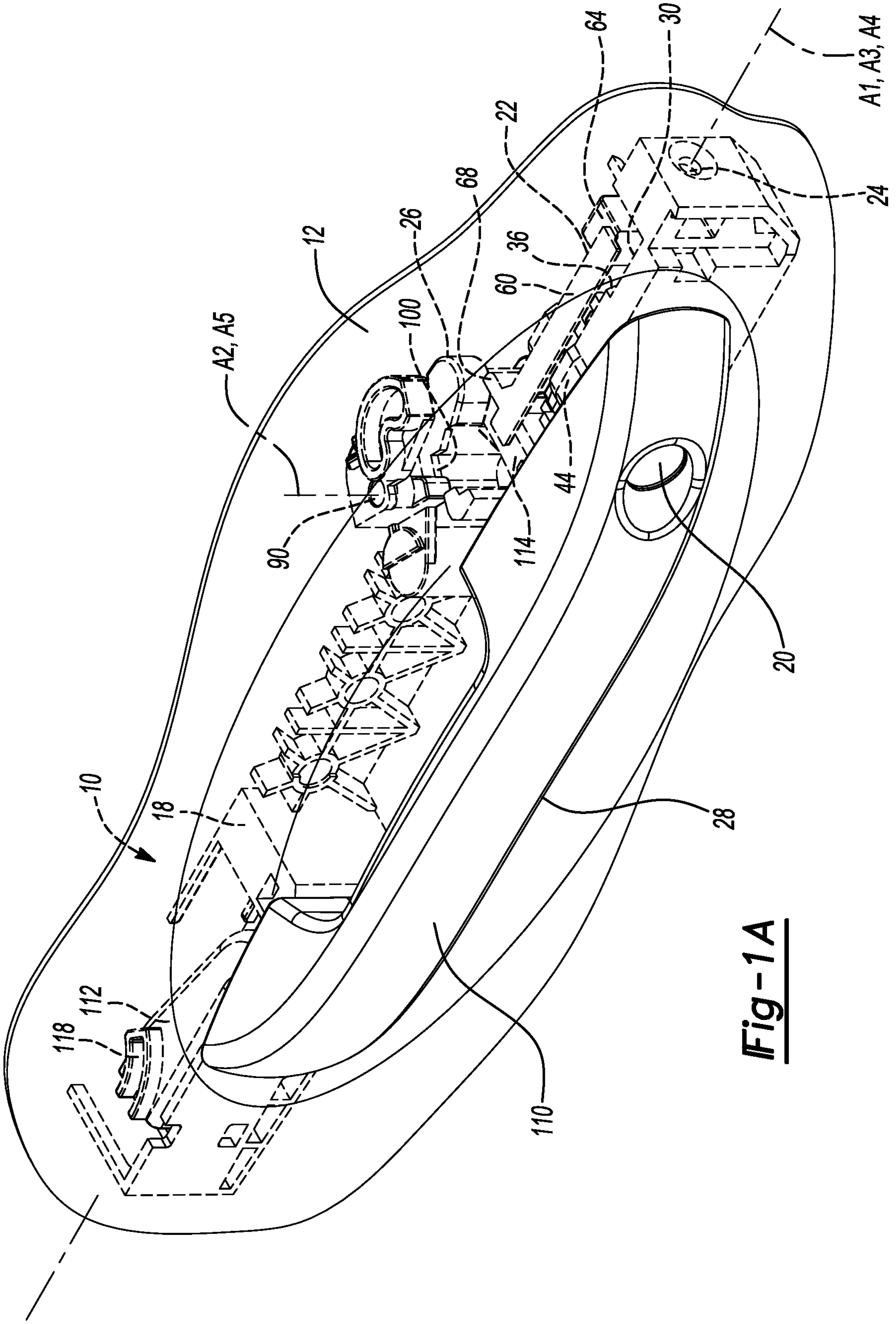
FIG. 1A is a front perspective view of a door handle assembly in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

With reference to FIGS. 1A-3F, a handle assembly 10 is shown. As illustrated in FIG. 1A, the handle assembly 10 may be coupled to a door panel 12 or other access location of an automobile or other vehicle (not shown). As will be described in more detail below, during operating, the handle assembly 10 may be used to open the door, including the panel 12, relative to the vehicle.

Figure 2:
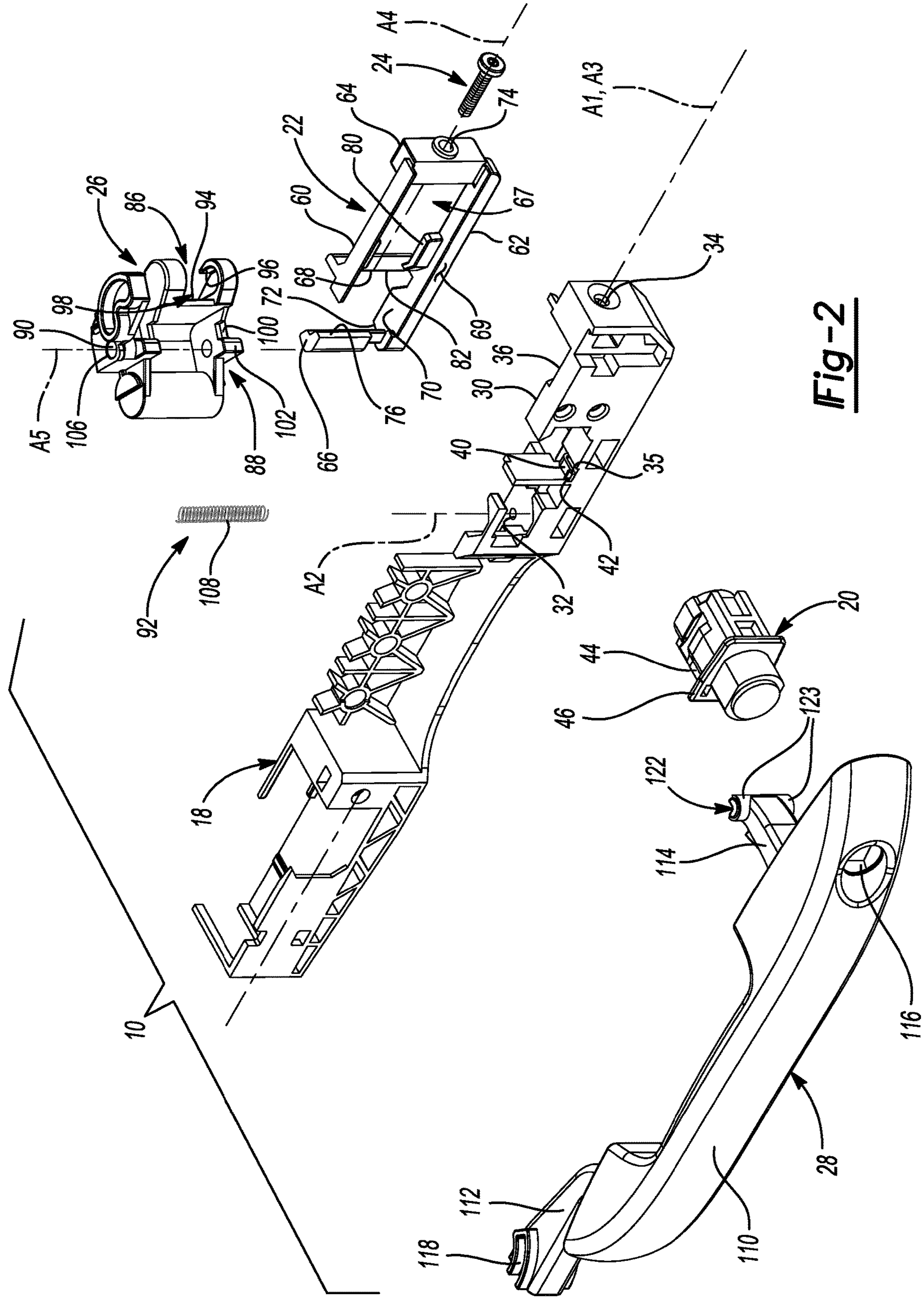
FIG. 2 is an exploded view of the door handle assembly of FIG. 1A.

With reference to at least FIG. 2, the handle assembly 10 may include a support bracket 18, a lock cylinder 20, a slide member 22, an actuation member 24, a counterweight 26, and a handle 28. The support bracket 18 may include a track 30, one or more pivot features 32, an aperture 34, and one or more clips 35. The track 30 may include one or more surfaces 36 extending along or substantially parallel to an axis A1. In some implementations, each surface 36 is substantially planar and coplanar with each of the other surfaces 36. The pivot features 32 may include one or more apertures aligned with an axis of rotation A2. As illustrated, the axis of rotation A2 may be transverse (e.g., orthogonal) to the axis A1. The aperture 34 may extend along an axis A3 substantially parallel to the axis A1. The clips 35 may each include a flexible arm 40 and a catch 42 disposed at an end thereof. As will be explained in more detail below, in an assembled configuration, or during method of using the handle assembly 10 (e.g., an assembly method or a service method), the clips 35 may engage the lock cylinder 20 to secure the lock cylinder 20 to the bracket 18.

As illustrated in FIG. 2, the lock cylinder 20 may include a body portion 44 and a rim portion 46. With reference to FIG. 3C, the body portion 44 may include one or more outwardly extending projections 48 and an aperture or other feature (not shown) configured to receive a key to allow a user to unlock the handle assembly 10 and open the door 12. For example, as illustrated in FIG. 3C, in some implementations, the body portion 44 includes a two projections 48 disposed on opposite sides of the body portion 44. Each projection 48 may define an engagement surface 50 extending outwardly from the body portion 44. The rim portion 46 may include an upper surface 54 and a lower surface 56 opposite the upper surface 54. The upper and lower surfaces 54, 56 may extend outwardly from the body portion 44. In some implementations, the lower surface 56 is transverse (e.g., orthogonal) to the body portion 44.

With reference to FIG. 2, the slide member 22 may include a first lateral arm 60, a second lateral arm 62, a proximal end member 64, a distal end member 66, and an intermediate member 68. The first and second lateral arms 60, 62 may extend between the proximal and distal end members 64, 66. In particular, the first and second lateral arms 60, 62 may extend from the proximal end member 64 toward or to the distal end member 66 such that the first and second lateral arms 60, 62 and the proximal and distal end members 64, 66 collectively define a void or window 67 therebetween. The first and second lateral arms 60, 62 may each include one or more slide surfaces 69 and one or more guide portions 70. As will be explained in more detail below, in an assembled configuration, the support bracket 18 may receive the slide member 22 such that the slide surfaces 69 slidably engage the surfaces 36 of the track 30 for translation in a direction substantially parallel to the axis A1. In this regard, each slide surface 69 may be substantially planar and coplanar with each of the other slide surfaces 69.

The guide portions 70 may extend from the first or second lateral arms 60, 62 and may include one or more guide surfaces 72. For example, a first of the guide portions 70 may extend from the first lateral arm 60, and a second of the guide portions 70 may extend from the second lateral arm 62. The guide surfaces 72 may be substantially planar and disposed at a non-orthogonal angle relative to the slide surfaces 69. For example, in some implementations, the guide surfaces 72 are disposed at an angle between ten degrees and eighty degrees relative to the slide surfaces 69. As will be explained in more detail below, in the assembled configuration, or during a method of using the handle assembly 10 (e.g., an assembly method or a service method), the guide surfaces 72 may engage the counterweight 26 to cause the counterweight to pivot about the rotational axis A2.

As previously described, the proximal and distal end members 64, 66 may extend from and between the first and/or second lateral arms 60, 62. The proximal end member 64 may include an aperture 74 extending along an axis A4 substantially parallel to the slide surfaces 69. In some implementations, the aperture 74 is threaded and centrally disposed between the first and second lateral arms 60, 62. As will be explained in more detail below, in the assembled configuration, or during the methods of using the handle assembly 10 (e.g., the assembly method or the service method), the aperture 74 may threadably engage the actuation member 24 to cause the slide member 22 to translate in a direction substantially parallel to the axes A1, A3, A4.

The distal end member 66 may include a stop surface 76 facing or defining, in part, the window 67. As will be explained in more detail below, during a method of using the handle assembly 10 (e.g., a method of accessing the door by actuating the handle 28), the stop surface 76 may engage the counterweight 26 to inhibit rotation of the counterweight 26 about the rotational axis A2.

The intermediate member 68 may extend from and between the first and second lateral arms 60, 62. In particular, the intermediate member 68 may extend across the window 67 such that the intermediate member 68 is disposed between the proximal and distal end members 64, 66. In some implementations, the intermediate member 68 extends in a direction substantially parallel to the proximal and distal end members 64, 66. The intermediate member 68 may include a lock cylinder engagement surface 80 and a handle guide surface 82 opposite the lock cylinder engagement surface 80. In this regard, the lock cylinder engagement surface 80 may face the proximal end member 64, and the handle guide surface 82 may face the distal end member 66. As will be explained in more detail below, during operation, the lock cylinder engagement surface 80 may engage the lock cylinder 20 to prevent removal (e.g., by theft) of the lock cylinder 20 from the bracket 18. In this regard, the lock cylinder engagement surface 80 may be referred to herein as the theft prevention surface 80.

Figure 3A:
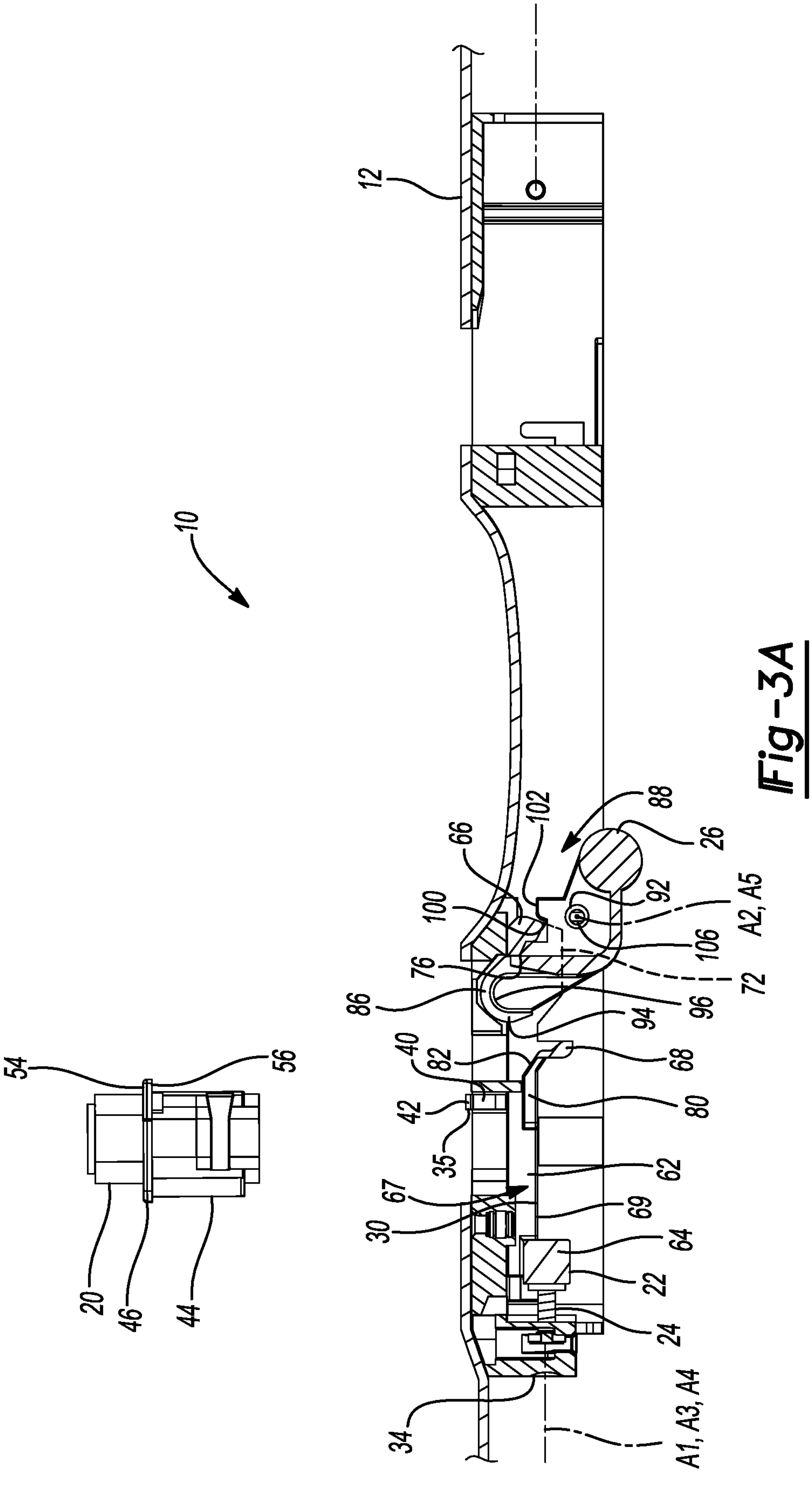
FIG. 3A is a cross-sectional view of the door handle assembly of FIG. 1A in a first configuration.

As illustrated in at least FIG. 3A, the lock cylinder engagement surface 80 may extend in a direction substantially perpendicular to the axis A4, while the handle guide surface 82 may be disposed at a non-orthogonal angle relative to the axis A4. For example, the handle guide surface 82 may be disposed an angle less than ninety degrees and greater than zero degrees relative to the axis A4. In some implementations, the handle guide surface is disposed at an angle between thirty degrees and seventy degrees relative to the axis A4. As will be explained in more detail below, in the assembled configuration, or during method of using the handle assembly 10 (e.g., an assembly method or a service method), the lock cylinder engagement surface 80 may engage the lock cylinder 20 to secure the lock cylinder 20 within the support bracket 18.

With reference to FIG. 2, the actuation member 24 may include a screw, bolt, or other suitable device (e.g., a spring or other biasing member) operable to actuate (e.g., move, translate, etc.) the slide member 22. For example, as illustrated in at least FIG. 2, in some implementations, the actuation member 24 includes a threaded bolt. As will be explained in more detail below, in the assembled configuration, the actuation member 24 may be received by the support bracket 18 and the slide member 22 to allow the slide member 22 to translate relative to the support bracket 18 along the axes A1, A3, A4. For example, the actuation member 24 may be rotatably received by the support bracket 18 and threadably received by the aperture 74, such that rotating the actuation member 24 about the axis A4 causes the slide member 22 to translate relative to the support bracket 18 along the axes A1, A3, A4.

Figure 1B:
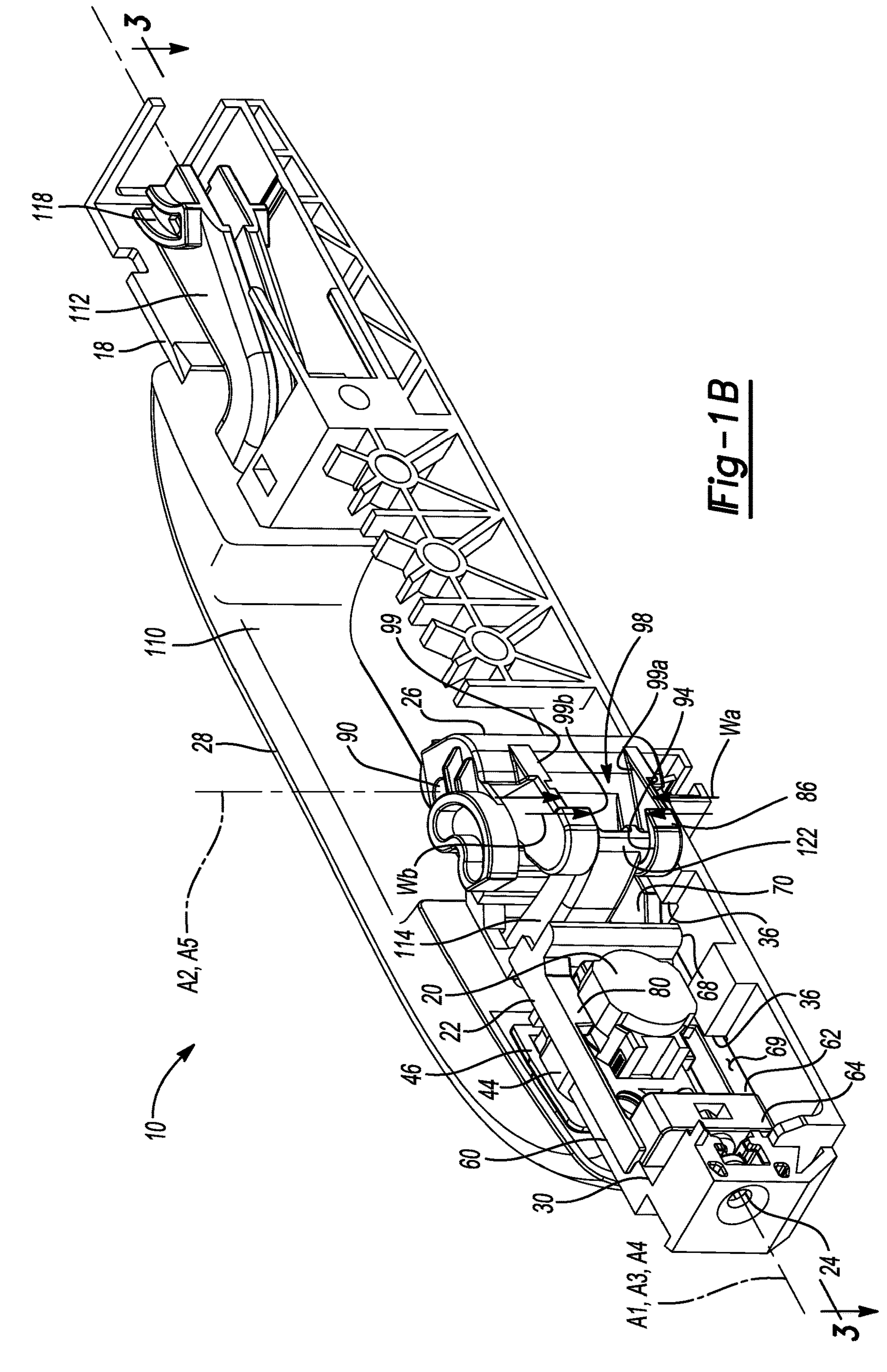
FIG. 1B is a rear perspective view of the door handle assembly of FIG. 1A.

With further reference to FIG. 2, the counterweight 26 may include a handle receiving feature 86, a slide member engagement feature 88, one or more pivot features 90, and an actuator 92. As illustrated in FIG. 2, the handle receiving feature 86 may include one or more hooks 94, each defined by a U-shaped surface 96. In some implementations, the handle receiving feature 86 includes a pair of hooks 94 defining a space or chamber 98 (FIG. 1B) and a window 99 in communication with, or otherwise opening into, the chamber 98. As illustrated in FIG. 1B, the window 99 may include a first portion 99*a* defining a first width Wa and a second portion 99*b* defining a second width Wb. The first portion 99*a* may be offset from the second portion 99*b* in a direction substantially orthogonal to an axis of rotation A5, while the first and second widths Wa, Wb may extend in a direction substantially parallel to the axis of rotation A5. As illustrated, the first width Wa may be greater than the second width Wb.

The slide member engagement feature 88 may include a flange having a plurality of surfaces extending transversely from one another. For example, the slide member engagement feature 88 may include a pre-stage engagement surface 100 and a home engagement surface 102. The pre-stage engagement surface 100 may be offset from the home engagement surface 102 such that the pre-stage and home engagement surfaces 100, 102 define a non-orthogonal angle (e.g., greater than ninety degrees and less than one hundred eighty degrees) therebetween.

The pivot features 90 may include one or more hubs 106 aligned with the axis of rotation A5. As illustrated, the slide-member engagement feature 88 (e.g., a flange), including the pre-stage and home engagement surfaces 100, 102 may be radially offset from the axis of rotation A5. The pivot features 90 may be sized and shaped to receive the pivot features 32 of the support bracket 18 such that the counterweight 26 can pivot or rotate relative to the support bracket 18 about the axes A2, A5. In this regard, while the pivot features 32 are generally shown and described herein as being apertures, and the pivot features 90 are generally shown and described herein as being hubs, it will be appreciated that the pivot features 32 may include hubs, and the pivot features 90 may include apertures within the scope of the present disclosure. As will be explained in more detail below, during operation of the handle assembly 10, the guide surfaces 72 of the slide member 22 may slidably engage the pre-stage engagement surface 100 or the home engagement surface 102 to apply a torque about the axes A2, A5 and cause the counterweight 26 to rotate about, or prevent rotation of the counterweight 26 about, the axes A2, A5.

As illustrated in FIG. 2, the actuator 92 may include a mechanical or electromechanical device operable to apply a torque on the counterweight 26 about the axis A5. In some implementations, the actuator 92 includes a spring 108 (e.g., a torsion spring), or other suitable biasing member, operable to rotate the counterweight 26 relative to the support bracket 18 about the axes A2, A5.

With further reference to FIG. 2, the handle 28 may include a body portion 110, a proximal leg 112, and a distal leg 114. The body portion 110 may define an aperture 116 sized and shaped to receive the lock cylinder 20. The proximal leg 112 may extend from the body portion 110 and may include a bracket-receiving feature 118 (e.g., a channel, slot, pin, etc.) configured to translatably or rotatably receive the support bracket 18. In this regard, the support bracket 18 may include a corresponding handle-receiving feature (e.g., a channel, slot, pin, etc.) configured to translatably or rotatably receive the bracket-receiving feature 118 of the handle 28. As will be explained in more detail below, during operation of the handle assembly 10, the handle 28 may rotate or translate relative to the support bracket 18 about the bracket-receiving feature 118.

The distal leg 114 may extend from the body portion 110 and may include a counterweight-receiving feature 122. In some implementations, the distal leg 114 is disposed between the proximal leg 112 and the aperture 116. The counterweight-receiving feature 122 may include one or more cylindrical pins 123. For example, in some implementations, the counterweight-receiving feature 122 includes a pair of opposed pins 123 extending outwardly from the distal leg 114. As will be explained in more detail below, in the assembly configuration, or during method of using the handle assembly 10 (e.g., an assembly method or a service method), the handle-receiving feature 86 of the counterweight 26 may rotatably receive the counterweight-receiving feature 122 of the handle 28. In particular, the hooks 94 of the counterweight 26 may rotatably receive the pins 123 of the distal leg 114. In this regard, while the counterweight 26 is generally shown and described herein as including hooks 94, and the handle 28 is generally shown and described herein as including pin 122, it will be appreciated that, the counterweight 26 may include pins and the handle 28 may include hooks to receive the pins of the counterweight 26 within the scope of the present disclosure.

Figure 3B:
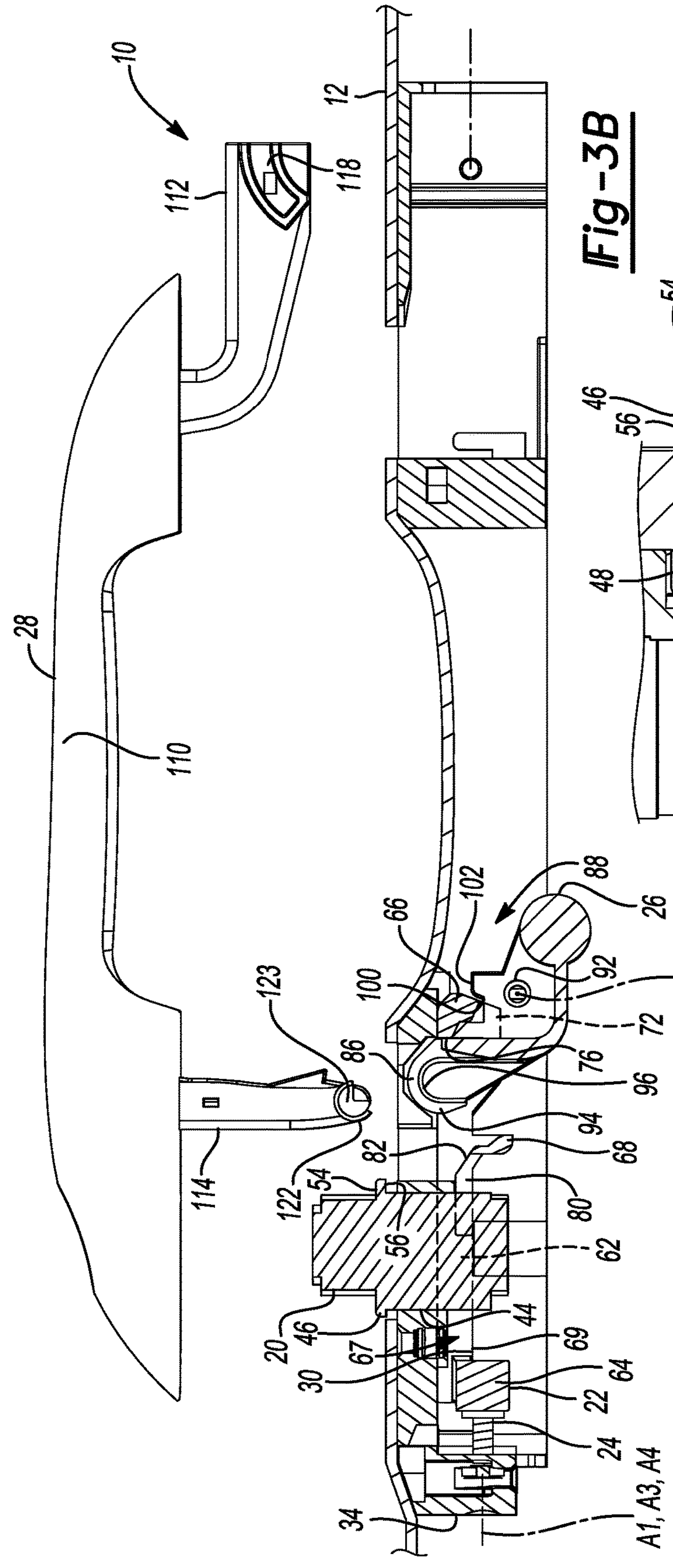
FIG. 3B is a cross-sectional view of the door handle assembly of FIG. 1A in a second configuration.
Figure 3C:
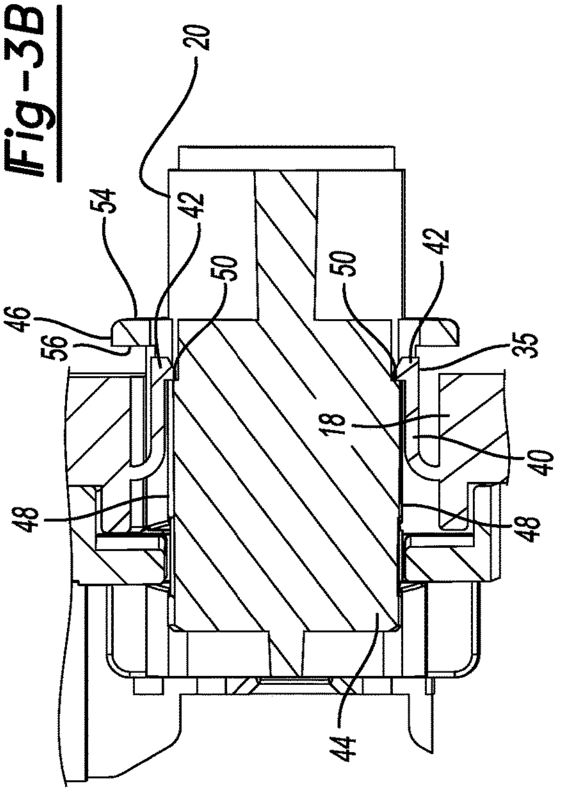
FIG. 3C is a cross-sectional view of a bracket and lock cylinder of the door handle assembly of FIG. 1A in the second configuration.
Figure 4:
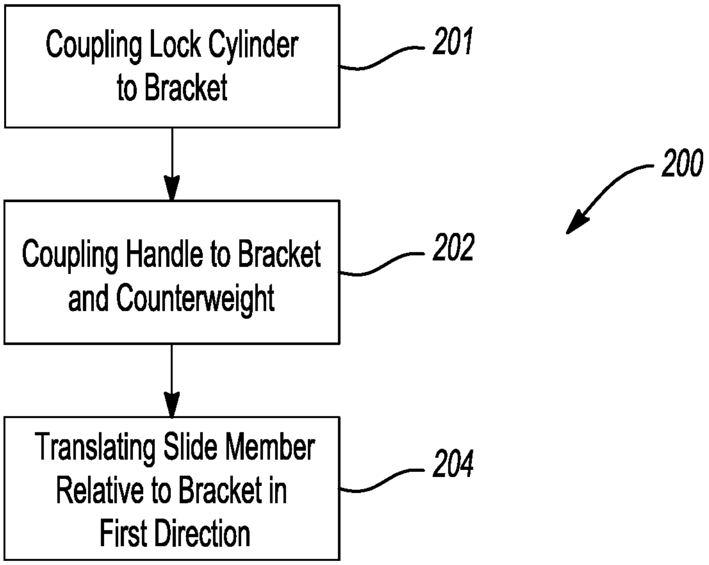
FIG. 4 is a flowchart illustrating a method of assembling a door handle assembly in accordance with the principles of the present disclosure.

With reference to FIG. 4, a method 200 of assembling the handle assembly 10 will now be described. At step 201, the method may include coupling the lock cylinder 20 to the bracket 18. For example, as illustrated in FIGS. 3A-3C, at step 201, a user may insert the lock cylinder 20 into an aperture or other void formed within the bracket 18 such that the lower surface 56 of the rim portion 52 engages or faces the bracket 18. In some implementations, at step 201, the method may include securing the lock cylinder 20 relative to the bracket 18. For example, with reference to FIG. 3C, the method may include engaging the clips 35 with the projections 48 of the lock cylinder 20 to inhibit movement of the lock cylinder 20 relative to the bracket 18. In particular, the method may include engaging the catch 42 with the engagement surface 50 of the projection 48 to prevent the lock cylinder 20 from moving relative to the bracket 18 in a direction substantially orthogonal to the axis A1. In some implementations, however, the bracket 18 may be formed without the aperture or other void formed within the bracket 18, such that the method 200 does not include step 201.

During step 201, the slide member 22 may engage the counterweight 26 to prevent rotation of the counterweight 26 relative to the bracket 18 about the axis A5. In particular, as illustrated in FIG. 3A, the pre-stage engagement surface 100 of the counterweight 26 may engage the guide surface 72 of the slide member 22 to prevent rotation of the counterweight 26 about the axis A5.

Figure 3D:
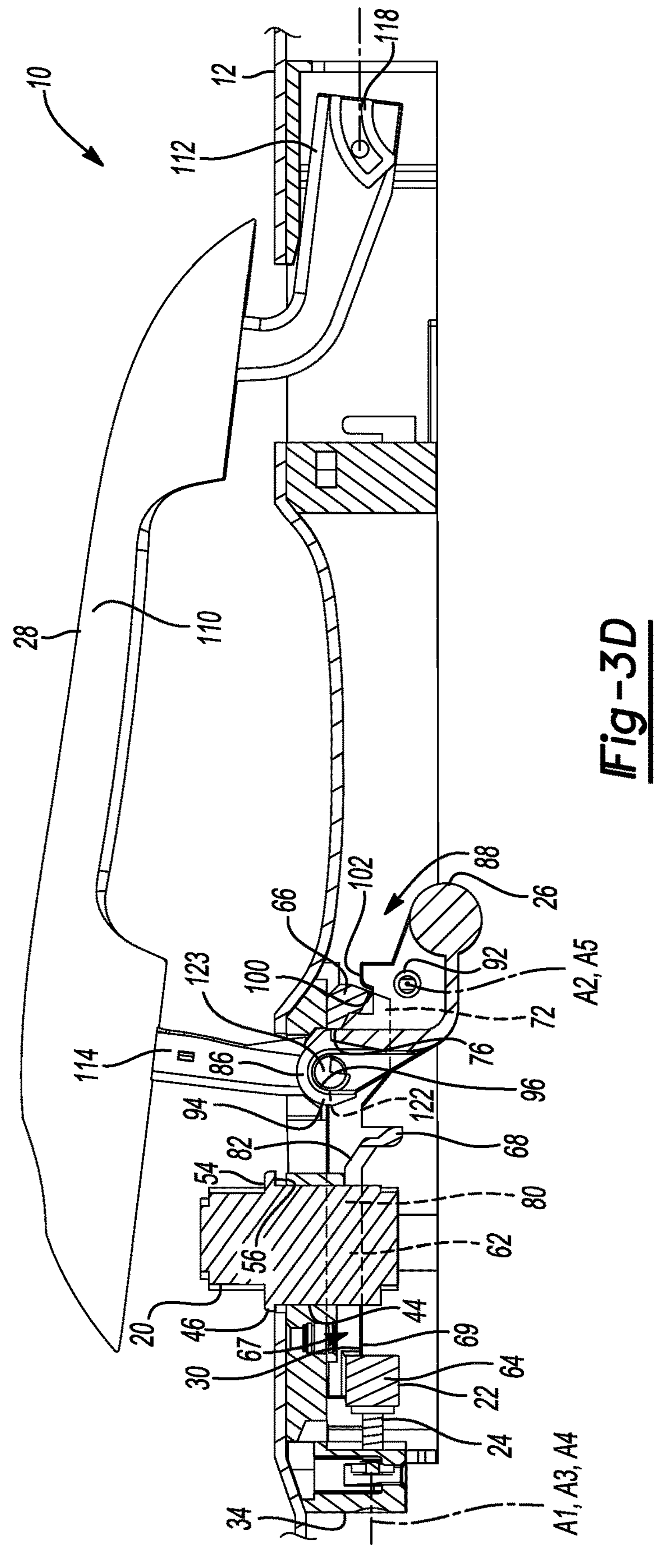
FIG. 3D is a cross-sectional view of the door handle assembly of FIG. 1A in a fourth configuration.
Figure 3E:
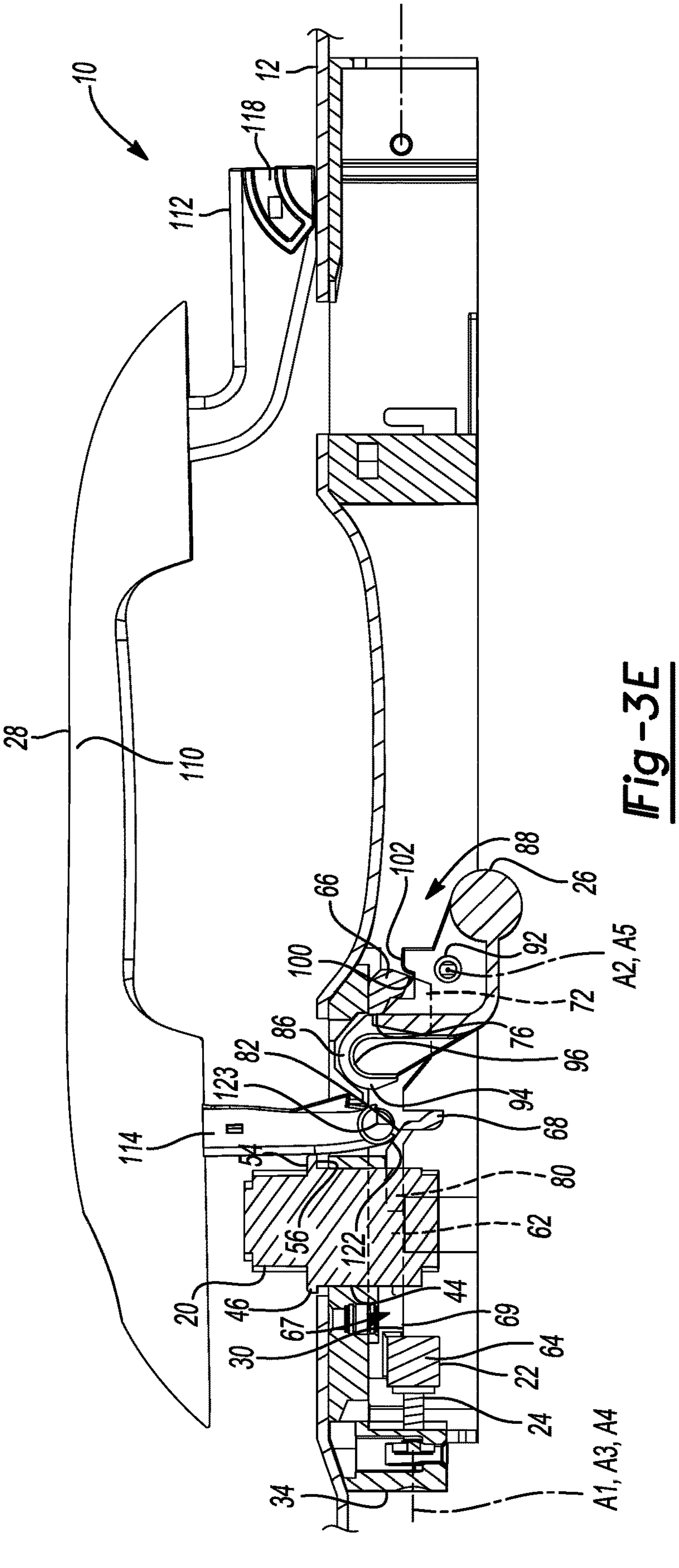
FIG. 3E is a cross-sectional view of the door handle assembly of FIG. 1A in a fifth configuration.

At step 202, the method may include coupling the handle 28 to the bracket 18 and the counterweight 26. For example, as illustrated in FIG. 3D, at step 202, the user may couple the proximal leg 112 of the handle 28 to the bracket 18 and couple the distal leg 114 of the handle 28 to the counterweight 26. In particular, as illustrated in FIG. 3D, the user may insert the distal leg 114 through the window 67 of the slide member 22 until the distal leg 114 engages, and slides along, the handle guide surface 82 of the slide member 22. As the distal leg 114 slides along the handle guide surface 82, the handle 28 may move in a direction away from the lock cylinder 20 (e.g., non-orthogonal to the axis A1) until the handle-receiving feature 86 of the counterweight 26 engages the counterweight-receiving feature 122 of the handle 28. In particular, the distal leg 114 may move towards the counterweight 26, through the window 99 (e.g., first portion 99*a*) and into the chamber 98, until the hooks 94 receive the pins 123 of the distal leg 114. In some implementations, step 202 may occur after step 200.

Figure 3F:
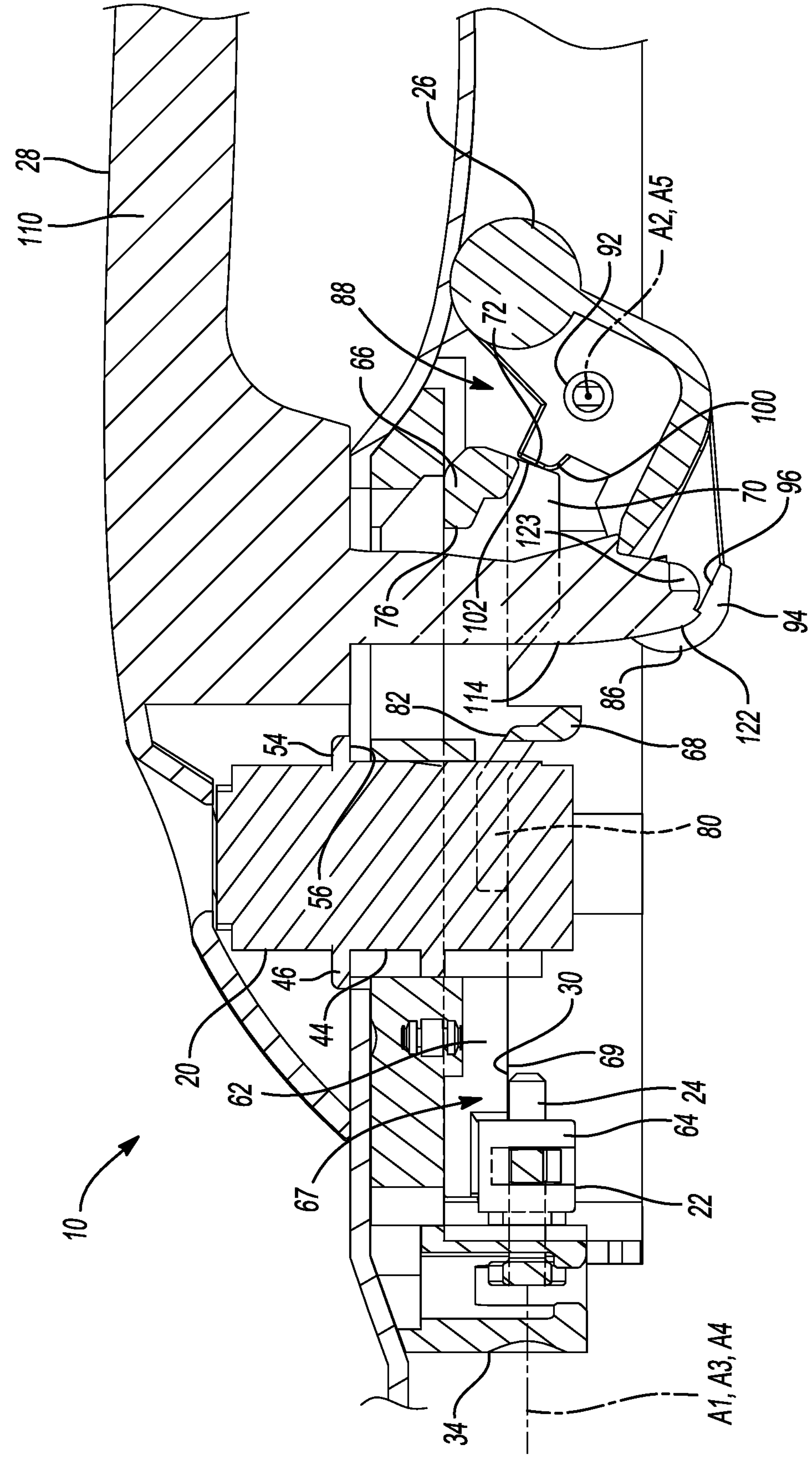
FIG. 3F is a cross-sectional view of a portion of the door handle assembly of FIG. 1A taken along the line 3-3 of FIG. 1B and showing the door handle assembly in a sixth configuration.

At step 204, the method may include translating the slide member 22 relative to the bracket 18 in a direction substantially parallel to the axis A1. In this regard, prior to step 204, the slide member 22 and the counterweight 26 may each be in a pre-stage position. For clarity, the pre-stage position of the slide member 22 and the counterweight 26 may be referred to herein as a first position, a second position, a third position, etc. For example, as illustrated in FIG. 3F, at step 204, the method may include translating the slide surfaces 69 in a first direction along or relative to the surfaces 36 of the track 30 such that the intermediate member 68 of the slide member 22 moves toward the lock cylinder 20. In particular, step 204 may include actuating the actuation member 24 to move the slide member 22 along the axis A1. For example, the user may rotate the actuation member 24 in a first rotational direction such that the actuation member 24 threadably engages the slide member 22 and applies a force on the slide member 22 to move the intermediate member 68 towards the lock cylinder 20. In this regard, the slide member 22 may translate from a first position (e.g., pre-stage position, FIGS. 3A-3E) to a second position (e.g., staged position, FIG. 3F) in the first direction along the axis A1 until the lock cylinder engagement surface 80 of the intermediate member 68 engages the lock cylinder 20, and the pre-stage engagement surface 100 of the counterweight 26 disengages the guide surface 72 of the slide member 22.

As the pre-stage engagement surface 100 of the counterweight 26 disengages the guide surface 72 of the slide member 22 during translation of the slide member 22, the actuator 92 (e.g., spring 108) may cause the counterweight 26 to rotate from a first rotational position (e.g., the pre-stage position) to a second rotational position (e.g, the staged position) in a second rotational direction about the axis A5, which may, in turn (via engagement of the hooks 94 with the pins 123) cause the handle 28 to rotate from a full position to a home position about the proximal leg 112 until the aperture 116 of the handle 28 receives the lock cylinder 20.

During a method of using the handle assembly 10, the user may pull the handle 28 from the home position to the full position to cause the handle 28 to rotate relative to the bracket 18 about the proximal leg 112. The handle 28 may rotate about the proximal leg 112, causing the counterweight 26 to rotate in a third rotational direction, opposite the second rotational direction, about the axis A3 until the counterweight 26 engages the slide member 22. For example, the counterweight 26 may engage the stop surface 76 of the slider member 22 to inhibit rotation of the counterweight 26 in the third rotational direction about the rotational axis A2 and, in turn, inhibit rotation of the handle 28 about the proximal leg 112.

Figure 5:
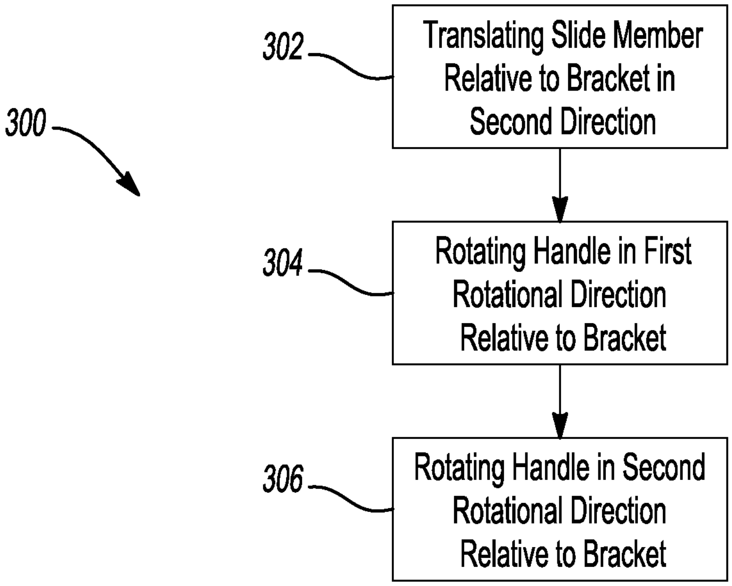
FIG. 5 is a flowchart illustrating a method of using a door handle assembly in accordance with the principles of the present disclosure.

With reference to FIG. 5, a method 300 of servicing the handle assembly 10 will now be described. At step 302, the method may include actuating the actuation member 24 to move the slide member 22 along the axis A1. For example, the user may rotate the actuation member 24 in a fourth rotational direction, opposite the first rotational direction, such that the actuation member 24 threadably engages the slide member 22 and applies a force on the slide member 22 to move the intermediate member 68 away from the lock cylinder 20. In this regard, the slide member 22 may translate from the second position (e.g., the staged position) to the first position (e.g., the pre-stage position) in a second direction, opposite the first direction, along the axis A1 until the lock cylinder engagement surface 80 of the intermediate member 68 disengages the lock cylinder 20, and the home engagement surface 102 of the counterweight 26 engages the guide surface 72 of the slide member 22.

As the home engagement surface 102 of the counterweight 26 engages the guide surface 72 of the slide member 22, the force of the slide member 22 on the counterweight 26 may overcome the force or torque of the actuator 92 (e.g., spring 108) and cause the counterweight 26 to rotate from the second rotational position (e.g., the staged position) to the first rotational position (e.g, the pre-stage position) in the third rotational direction about the axis A5, until the guide surfaces 72 of the slide member 22 engage the pre-stage engagement surface 100 of the counterweight 26, which may, in turn (via engagement of the hooks 94 with the pins 123) cause the handle 28 to rotate from the home position to the full position about the proximal leg 112 until the lock cylinder 20 exits the aperture 116.

At step 304, the method may include rotating the handle 28 relative to the bracket 18 about the proximal leg 112 toward the home position until the handle-receiving feature 86 (e.g., hooks 94) of the counterweight 26 disengages the counterweight-receiving feature 122 (e.g., pins 123) of the handle 28.

At step 306, the method may include rotating the handle 28 relative to the bracket 18 about the proximal leg 112 toward the full position until the proximal leg 112 exits the bracket 18 and the handle 28 is disengaged from the rest of the handle assembly 10.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A door handle assembly comprising:

a bracket including a clip having a flexible arm and a catch disposed at an end of the arm;

a slide member coupled to the bracket and configured to translate between a first position and a second position;

an actuation screw that is rotatably coupled to the bracket and threadably coupled to the slide member via threads on the actuation screw and corresponding threads on the slide member, the actuation screw translating the slide member from the first position to the second position upon rotation of the actuation screw;

a lock cylinder including a cylindrical body having a projection extending outwardly from the cylindrical body, the projection being configured to engage with the catch to couple the lock cylinder to the bracket, wherein the slide member engages the lock cylinder in the second position; and a counterweight pivotally coupled to the bracket and configured to rotate between a first rotational position and a second rotational position, wherein, upon translation of the slide member from the second position to the first position, the slide member is operable to (i) rotate the counterweight in a first direction from the second rotational position to the first rotational position and (ii) prevent rotation of the counterweight in a second direction from the first rotational position.

2. The door handle assembly of claim 1, further comprising an actuator operably coupled to the counterweight, wherein, upon translation of the slide member from the first position to the second position, the actuator is operable to rotate the counterweight in the second direction.

3. The door handle assembly of claim 1, further comprising a handle rotatably coupled to the bracket, the handle including a body and a leg extending from the body and coupled to the counterweight, wherein the counterweight is configured to rotate the handle relative to the body upon rotation in the first direction and the second direction.

4. The door handle assembly of claim 3, wherein the counterweight includes a hook and the leg includes a pin pivotally coupled to the hook.

5. The door handle assembly of claim 1, wherein the counterweight includes an engagement surface and the slide member includes a guide surface, the guide surface configured to slidably engage the engagement surface to rotate the counterweight in the first direction.

6. A door handle assembly comprising:

a bracket including a clip having a flexible arm and a catch disposed at an end of the arm;

a slide member translatably coupled to the bracket and including an aperture;

an actuation screw that is rotatably coupled to the bracket and threadably coupled to the slide member via threads on the actuation screw and corresponding threads on the slide member, the actuation screw translating the slide member from the first position to the second position upon rotation of the actuation screw;

a lock cylinder configured to engage with the catch to having a cylindrical body disposed within the aperture and including projection extending outwardly from the cylindrical body, the projection being couple the lock cylinder to the bracket, wherein the slide member engages the lock cylinder in the second position;

a counterweight pivotally coupled to the bracket and having a handle-receiving portion;

a handle rotatably coupled to the bracket and having a leg portion pivotally received by the handle-receiving portion; and an actuator operably coupled to the counterweight and configured to pivot the counterweight in a first direction, wherein, the slide member is operable to pivot the counterweight in a second direction opposite the first direction.

7. The door handle assembly of claim 6, wherein the slide member includes a stop surface operable to abut the counterweight and inhibit rotation of the counterweight in the second direction.

8. The door handle assembly of claim 6, wherein, upon translation of the slide member from a first position to a second position, the actuator is operable to rotate the counterweight in the first direction.

9. The door handle assembly of claim 6, wherein the counterweight is configured to rotate the handle in the first direction relative to the bracket.

10. The door handle assembly of claim 6, wherein the handle-receiving portion includes a hook and the leg portion includes a pin pivotally coupled to the hook.

11. The door handle assembly of claim 6, wherein the counterweight includes an engagement surface configured to slidably engage the slide member to pivot the counterweight in the second direction.

12. A method of assembling a door handle assembly, the method comprising:

coupling a door handle to a bracket and a counterweight, the counterweight pivotally supported by the bracket and the bracket including a clip having a flexible arm and a catch disposed at an end of the arm;

translating a slide member relative to the bracket by rotating an actuation screw that is rotatably coupled to the bracket and threadably coupled to the slide member via threads on the actuation screw and corresponding threads on the slide member to allow the counterweight to pivot relative to the bracket;

coupling a lock cylinder having a cylindrical body including extending outwardly from the cylindrical body to the bracket by engaging the projection with the catch; and engaging the counterweight with the door handle to rotate the door handle relative to the bracket.

13. The method of claim 12, wherein the lock cylinder is coupled to the bracket prior to coupling the door handle to the bracket, wherein rotating the door handle relative to the bracket includes disposing the lock cylinder within an aperture of the door handle.

* * * * *